UNITED STATES PATENT OFFICE.

FRANK AHLBURG, OF FAIRBANKS, TERRITORY OF ALASKA.

PROCESS OF MARKING FRUIT.

1,151,507. Specification of Letters Patent. Patented Aug. 24, 1915.

No Drawing. Application filed March 8, 1915. Serial No. 12,856.

*To all whom it may concern:*

Be it known that I, FRANK AHLBURG, a subject of the Emperor of Germany, and a resident of Fairbanks, Territory of Alaska, have invented a certain new and useful Process of Marking Fruit, of which the following is a specification.

The invention relates to a process of marking or branding fruit.

An object of the invention is to provide a method of marking the skin of fruit in such manner that the marking will not in any way affect the keeping quality of the fruit and which marking enhances the appearance of the fruit.

The process relates particularly to the marking of fruit, such as apples, oranges and other citrus fruits, which have a natural wax coating on their skins, with colored markings or brands. Many fruits have a natural wax coating on their skins which renders the fruit impervious to moisture and air, thereby permitting the fruit to remain in good condition for long periods of time and I make use of this wax coating in marking the fruit.

In accordance with my invention, I melt a portion of the wax coating and heat the skin below it without removing the wax or breaking its surface, and introduce coloring matter into the heated portion, so that a colored brand is produced. In marking citrus fruits, marking without the use of color produces a burned appearing mark which does not improve the appearance of the fruit, but when color is employed, the mark has a pleasing and ornamental appearance.

In carrying out the process I prefer to impress the mark on the fruit by means of a die or other metallic body having on its surface the mark which is to be impressed on the fruit. The die is maintained at a temperature above the melting point of the wax, by any suitable means, such as an electric current passing through resistance wires arranged in thermal communication with the die. When an electric current is employed, means are preferably provided for controlling the current, so that the temperature of the die remains substantially constant. The temperature of the die is such that it rapidly melts the wax, but is not high enough to burn the wax. The temperature of the die should be different with different fruits and I have found that when marking apples the die should be kept at a temperature of about 160° Fahrenheit and when marking oranges should be kept at a temperature of approximately 300° Fahrenheit.

When the die is heated to the proper temperature, the coloring matter is applied thereto, preferably by means of a roller and the fruit is then brought in contact with the die for an instant and then removed. The coloring matter dries on the die before the die is applied to the fruit, but when in contact with the fruit the color again becomes liquid and is impressed on the fruit. I have found that with apples almost any coloring matter may be used, but with oranges it is preferable to employ coloring matter of a glycerin base. The skin of the orange contains cells which contain essential oil and water, and when heat is applied some of the cells are ruptured and the liberated oil redissolves the coloring matter. The heat of the die causes the wax coating to become fluid so that when the fruit is removed from the die the wax flows back and solidifies, entirely sealing the skin against air.

It is not essential that the coloring matter be applied to the die, but it may be sprayed or otherwise applied to the fruit either before the fruit is brought into contact with the die or immediately thereafter while the wax is still liquid. In either of these cases it will be necessary to wipe off the excess coloring matter after the wax has cooled.

I claim:

1. The method of marking fruit having a natural wax coating on its skin which consists in melting the wax covering a portion of the skin without removing the wax and introducing coloring matter into the melted wax.

2. The method of marking fruit having a natural wax coating on its skin which consists in bringing the fruit momentarily into contact with a body having coloring matter on its surface, the temperature of the body being above the melting point of the wax.

3. The method of marking fruit having a skin containing cells and covered with a natural wax coating which consists in melting the wax covering a portion of the skin and rupturing the cells below the melted wax.

4. The method of marking fruit having a skin containing cells of liquid which consists in bringing the fruit momentarily into contact with a hot body having coloring matter on its surface, whereby the cells are ruptured and the coloring matter is dissolved by the liquid liberated from the cells.

In testimony whereof, I have hereunto set my hand at San Francisco, California, this 1st day of March, 1915.

FRANK AHLBURG.

In presence of—
H. G. PROST,
N. THREW.